July 4, 1950
C. P. RENAUD
2,514,091
EARTHWORKING IMPLEMENT
Filed July 24, 1946
2 Sheets-Sheet 1
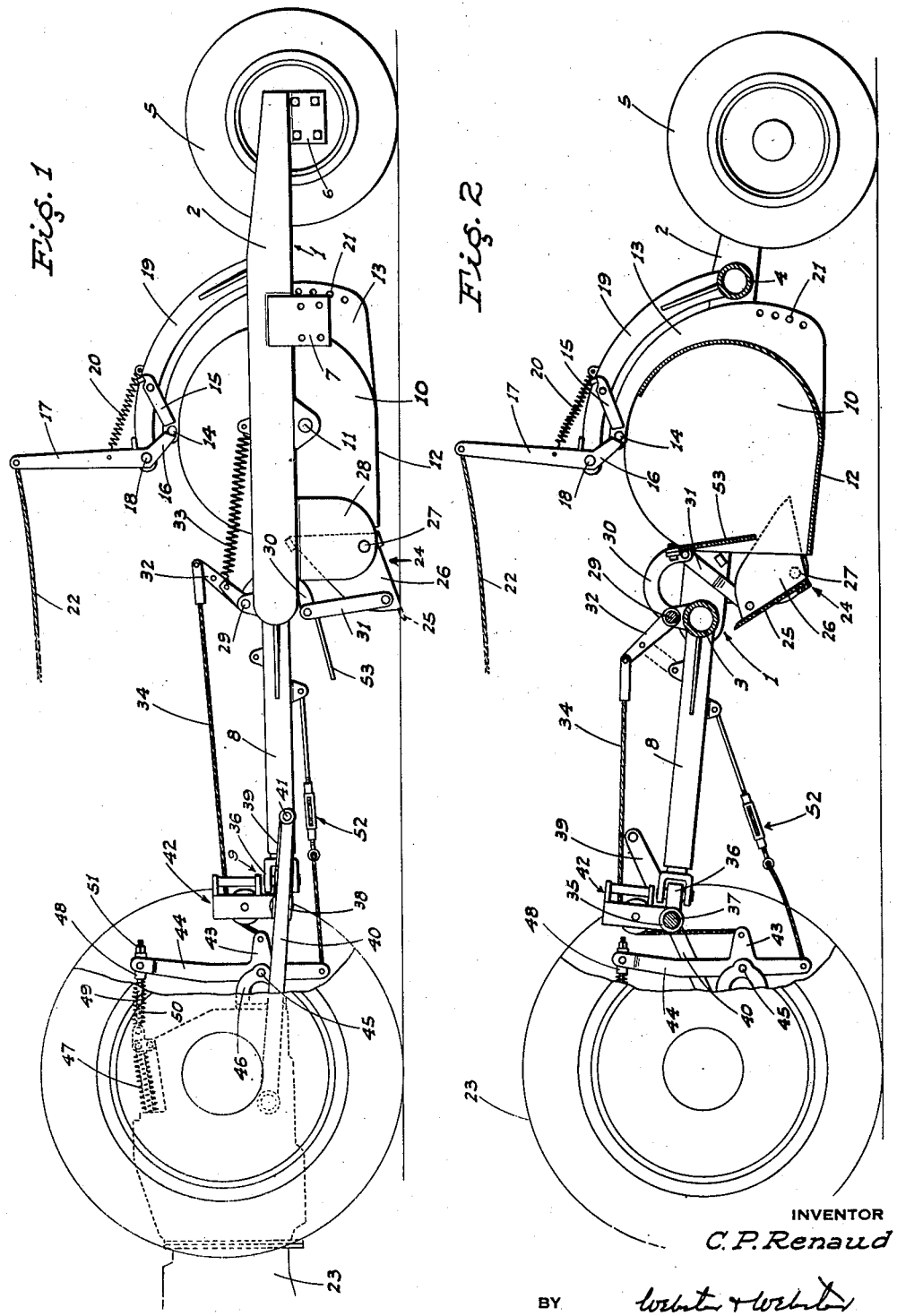
INVENTOR
C. P. Renaud
BY Webster + Webster
ATTORNEYS July 4, 1950
C. P. RENAUD
2,514,091
EARTHWORKING IMPLEMENT
Filed July 24, 1946
2 Sheets-Sheet 2
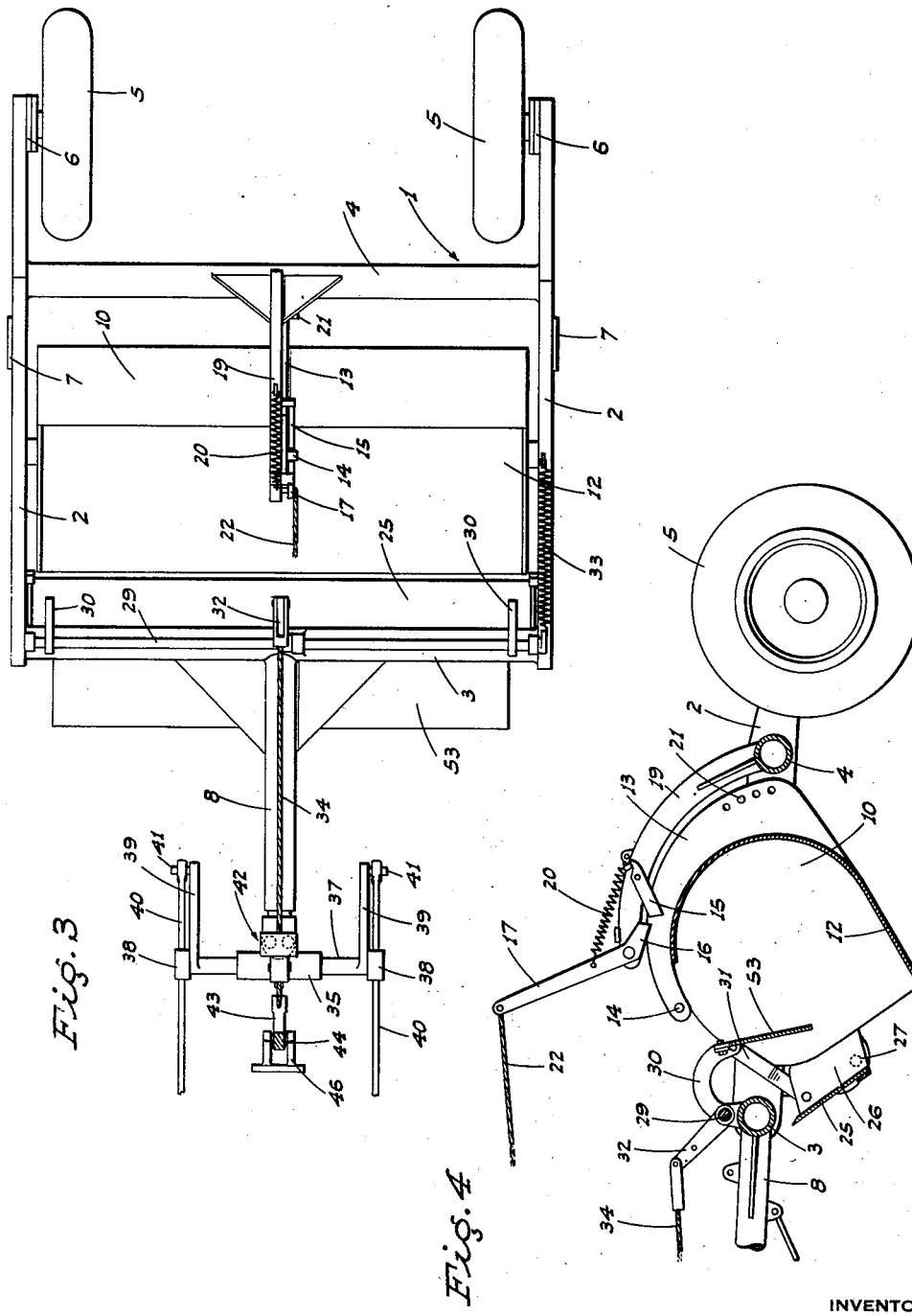
INVENTOR
C. P. Renaud
BY
ATTORNEYS Patented July 4, 1950

2,514,091

UNITED STATES PATENT OFFICE 2,514,091

EARTHWORKING IMPLEMENT

Collis P. Renaud, Tulare, Calif., assignor of one-half to Marvin Leroy Williams, Tulare, Calif.

Application July 24, 1946, Serial No. 685,853

14 Claims. (Cl. 37—129)

This invention relates generally to an improved earth working implement, particularly a tractor-drawn scraper which includes a bowl arranged to receive, carry, and dump earth which is dug by a separate frame-mounted blade unit cooperating with the bowl.

One object of the invention is to provide a scraper, of the type described, which includes a combination scraper blade and apron unit acting in one position as an earth digging blade, and in another position as a load retaining apron; said unit being automatically disposed in its digging position when the draft tongue of the scraper is relatively lowered, and disposed in its load retaining position when said draft tongue is relatively raised.

Another object is to provide a scraper as in the preceding paragraph especially designed for use with a tractor including a power lift mechanism at the rear; the scraper tongue being adapted to couple to said mechanism.

A further object is to incorporate in the scraper a loading apron or sweep plate arranged to swing, from ahead and above the same, rearwardly across the combination scraper and apron unit as the latter moves between digging and load retaining positions, whereby to facilitate final loading of the bowl and retention of the load therein.

A further object of the invention is to produce a practical earth working implement, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the scraper coupled to a tractor, and in loading position.

Fig. 2 is a longitudinal sectional elevation of the scraper in carrying position.

Fig. 3 is a plan view of the scraper.

Fig. 4 is a fragmentary longitudinal section of the scraper in dumping position.

Referring now more particularly to the characters of reference on the drawings, the scraper comprises a main frame, indicated generally at 1, and includes side beams 2, a front cross beam 3, and a rear cross beam 4. The side beams 2 extend rearwardly of the cross beam 4 some distance, and at their rear ends and on the inside carry wheels 5; said wheels being removably secured to attachment plates 6. If desired, the wheels may be removed from the plates 6 and attached to other attachment plates 7 on the outside of the beams 2 intermediate their ends, which is desirable for certain types of work.

A rigid tongue 8 extends forwardly and centrally from the front cross beam 3 and is provided, at the forward end, with a hitch assembly, indicated generally at 9, adapted to connect with a tractor in the manner hereinafter described in detail.

Between the front and rear cross beams 3 and 4, the scraper includes a roll-over type bowl 10 pivotally connected with the side beams 2, as at 11. The bowl 10 is normally disposed with its bottom 12 lowermost, at which time the open portion of said bowl is foremost, as clearly shown in Fig. 2. The bowl 10 is removably mounted in the frame.

The bowl is provided, centrally of its ends, with a curved back rib 13 including a stop pin 14 at its upper end; said stop pin 14 normally being disposed between a pivoted holding dog 15 which prevents retraction of the bowl in a clockwise direction, and an opposed stop 16 which normally prevents rotation of the bowl counterclockwise, i. e. in a dumping direction. The stop 16 is formed on the lower end of a bowl release lever 17 pivoted, as at 18, on the upper end of a rigid arcuate arm 19 which upstands from the rear cross beam 4 and overhangs the bowl 10. The holding dog 15 is pivoted on the arm 19, as shown. A spring 20 normally maintains the lever 17 in position so that the stop 16 is operative.

Adjacent its lower end the back rib 13 is provided with a vertically adjustable stop pin 21, and a pull cord 22 leads forwardly from the upper end of lever 17 to the operator's seat on the tractor, the latter being indicated generally at 23.

When the bowl is loaded in the manner hereinafter described, and the operator desires to dump the load, he merely pulls on the cord 22, whereupon the bowl 10 which is then in a lowered position bites, at its leading edge, into the ground so that with continued advance of the tractor the bowl is rolled or tumbled in a counterclockwise direction, causing dumping of the load therefrom. This rolling continues until the stop pin 21 snaps by the holding dog 15 and comes to rest against the stop 16. In this manner the bowl 10 is held in its inverted position as long as desired. Thereafter, with a further pull on cord 22 the pin 21 escapes stop 16 and the bowl makes the last half revolution and returns to its starting position, with the stop pin 14 abutting stop 16.

A combination cutting blade and apron unit, indicated generally at 24, is suspended from the main frame 1 ahead of the bowl 10 in cooperative relation to the latter, as follows:

A flat blade 25, of substantial width between its leading or cutting edge and its rear edge, extends from end to end of the bowl 10 but ahead of the latter, said blade 25 being fitted, at its ends, with upstanding side wings 26. The side wings 26 are pivoted, adjacent the bottom and back corner thereof, as at 27, on depending brackets 28 fixed in connection with the side beams 2.

With this arrangement it will be seen that the blade 25 is movable from a forwardly and downwardly inclined digging position, as in Fig. 1, to an upturned or upstanding load retaining position, as in Fig. 2. The blade 25 thus serves in the first named position to dig earth and deliver the same into the bowl, while in the second named position effectively blocks the forward end of the bowl to maintain the load therein.

By means of the following described arrangement the above combination scraper blade and apron unit is automatically shifted from digging to load retaining position upon raising of the tongue 8 from a lowered position to a relatively raised position, as is done to raise the bowl 10 from a loading to carrying position.

A cross shaft 29 is journaled on the front cross beam 3 above the latter, and adjacent opposite ends is fitted with substantially semi-circular arms 30 which extend downwardly when the blade 25 is in digging position, and extend rearwardly when said blade is in load retaining position as an apron.

Links 31 are pivotally connected between the outer ends of the arms 30 and the forward and lower corners of corresponding side wings 26. A rigid lever 32 upstands from the shaft 29 centrally of its ends, said lever normally being urged rearwardly by a spring 33 to a position with the arms 30 extending downwardly, at which time the links 31 position the blade 25 for ground engagement and digging. A suitable stop on the frame limits the inclination of such blade unit in its digging position. In such position the links 31 have passed forwardly beyond dead center—as in Fig. 1—thus locking the blade unit against upward movement. Thus the weight of the scraper bears on the blade unit and forces it into the ground during the digging operation.

A control cable 34 is connected to the upper end of the lever 32 and extends forwardly to the hitch assembly, indicated generally at 9, and which comprises the following:

A transverse sleeve 35 is fitted with a vertical axis hitch 36 secured to the forward end of the tongue 8. A cross shaft 37 is turnable in the sleeve 35 and projects beyond opposite ends thereof; said cross shaft having laterally outwardly opening saddles 38 at the ends thereof, and rigid legs 39 which extend rearwardly from adjacent said saddles.

The tractor 23 is of a type which includes a pair of rearwardly projecting, transversely spaced lift arms 40 which are power actuated, and said lift arms extend through the saddles 38 and are secured, as at 41, to the rear ends of the legs 39.

The power mechanism (not shown) which actuates the lift arms 40 is of the conventional "Ferguson" type which is fluid pressure actuated, and includes a hydraulic control system having a valve accessible to the tractor operator.

It will be seen that with vertical movement of the lift arms 40 a corresponding movement will be imparted to the tongue 8 and bowl 10.

The control cable 34 extends through a fairlead and direction-changing sheave unit 42 mounted in connection with the sleeve 35, and thence said cable depends to connection with a lateral, rearwardly projecting ear 43 on an upstanding lever 44 pivoted, intermediate its ends, as at 45, in connection with a bracket 46 attached to the rear end of the tractor frame.

A forwardly shiftable, spring retracted valve control unit 47, which is part of the tractor, serves when advanced to relieve the power lift mechanism, causing lowering of the lift arms 40.

The upper end of the lever 44 includes a slide collar 48 bearing against a compression spring 49 on a rod 50 connected to the unit 47, the compression of spring 49 being adjustable by a nut 51. At its lower end the lever 44 is connected by an adjustable stay 52, flexible in part, which leads rearwardly to connection with the tongue 8 intermediate its ends.

The vertical axis hitch 36, the fairlead and direction-changing sheave unit 42, and the flexible part of the stay 52 permit the tractor 23 to be steered relative to the scraper without interfering with any of the working parts.

When the lift arms 40 are in lowered position, the tongue 8 and bowl 10 are similarly lowered, with the bowl in loading position, at which time the blade 25 is in digging position, as shown in Fig. 1. With advance of the tractor the blade 25 digs earth and delivers it into the bowl until the latter is loaded. Then the lift arms 40 are raised to move the bowl upwardly to the carrying position of Fig. 2. When this occurs the control cable 34 is automatically pulled forward by reason of the elevation of the tongue 8 relative to the ear 43, and this causes the lever 32 to be swung forwardly, raising the arms 30 and links 31, until the blade 25 is positioned, as an apron, in load retaining relation to the then raised bowl. The manner in which the bowl is dumped has previously been described.

If, during the above operation of loading and lifting the bowl to carrying position, too great a load is imposed on the tractor at the rear, which would cause it to tip upwardly at the front, the "Ferguson" type power lift mechanism then functions in its conventional manner to actuate the arms 40 to decrease the digging depth of the blade.

Through the described connecting mechanism the valve control unit 47 is shifted forwardly, which as previously described then operates the hydraulic control system to lower the arms 40 to the extent necessary to relieve the overload.

A loading apron or sweep-plate 53 is disposed above the blade 25 and is connected, at opposite ends, with the outer ends of the rigid arms 30; said sweep plate 53 being affixed to said arms so that when the blade 25 is in digging position, the sweep-plate 53 is disposed some distance thereabove in forwardly projecting relation, as clearly shown in Fig. 1. It will thus be seen that when the arms 30 swing upwardly and rearwardly to raise the blade 25, the sweep-plate 53 will first swing across the latter and enter the forward end portion of the bowl. This sweeps a considerable quantity of dug earth into the bowl, whereby to facilitate the final loading thereof, and to thereafter serve as a secondary load retaining apron. In certain soil conditions the loading apron or sweep plate 53 may be unnecessary, and is therefore removably mounted on the scraper.

By removal of the bowl 10 from the implement the latter may be used as a soil cultivator or conditioner by merely setting the blade 25 to digging position, and permitting it to dig somewhat below the surface of the soil. Without the bowl on the implement the blade 25 effectively cultivates the top layer of the soil and severs all roots and weeds; the severed roots and weeds delivering from the blade mainly on top of the cultivated soil to dry.

From the foregoing description it will be readily seen that there has been produced such a device as substantially fulfills the objects of the invention as set forth herein.

While this specification sets forth in detail the present and preferred construction of the device, still, in practice such deviations therefrom may be resorted to as do not form a departure from the spirit of the invention, as defined by the appended claims.

Having thus described the invention, the following is claimed as new and useful, and upon which Letters Patent are desired:

1. In a scraper including a frame supporting a dumping bowl and having a rigid tongue means to connect the front end of the tongue to the power lift mechanism of a tractor whereby the tongue may be selectively lowered and raised, a transversely extending combination scraper blade and apron unit disposed in front of the bowl in cooperative relation, means mounting the unit on the frame for movement between a lowered scraping position and a raised load retaining position, and means actuated by lowering or raising of the tongue operative to automatically move said unit to scraping position and load retaining position, respectively.

2. A scraper as in claim 1 in which said last named means includes a control cable extending lengthwise of the tongue, a direction-changing sheave secured in connection with the tongue adjacent its forward end, the cable passing about the sheave, and an anchor for said cable adapted to connect to the tractor in vertically spaced relation to the point of direction changing of said cable.

3. A scraper as in claim 1 in which said mounting means includes side wings on the unit, brackets depending from the frame, and pivotal connections between corresponding side wings and brackets.

4. A scraper as in claim 1 in which said last named means comprises a cross shaft on the frame, rigid arms extending from opposite end portions of the shaft, links pivotally connected between the arms and opposite ends of the unit, a rigid lever on the shaft, a cable leading forwardly from the lever, a direction-changing sheave secured in connection with the tongue adjacent its forward end, the cable passing about the sheave, and an anchor for said cable adapted to connect to the tractor at the rear in vertically spaced relation to the point of direction changing of said cable.

5. In a scraper including a frame supporting a dumping bowl and having a rigid tongue adapted to connect to the power lift mechanism of a tractor at the rear, a transversely extending combination scraper blade and apron unit disposed in front of the bowl in cooperative relation, means mounting the unit on the frame for movement between a lowered scraping position and a raised load retaining position, and means actuated by lowering or raising of the tongue operative to automatically move said unit to scraping position and load retaining position, respectively; there being a sweep plate extending transversely of the scraper above said unit, and means securing the sweep plate in connection with said tongue actuated means for movement by the latter, upon raising of the tongue, from a forwardly projecting position rearwardly over said unit in advance of movement of the latter to its load retaining position.

6. A scraper as in claim 5 in which said tongue actuated means includes a cross shaft on the scraper, rigid parallel arms projecting radially from the shaft adjacent its ends, the shaft being turnable to swing the arms between a downwardly extending position and a rearwardly extending position, and links pivotally connected between the arms and corresponding ends of said unit; the sweep plate being attached at its ends to said arms.

7. In a scraper including a frame supporting a dumping bowl and having a rigid tongue adapted to connect to the power lift mechanism of a tractor at the rear, a transversely extending combination scraper blade and apron unit disposed in front of the bowl in cooperative relation, means mounting the unit on the frame for movement between a lowered scraping position and a raised load retaining position, and means actuated by lowering or raising of the tongue operative to automatically move said unit to scraping position and load retaining position, respectively; said last named means including a control cable extending lengthwise of the tongue, a horizontal axis direction changing sheave secured in connection with the tongue adjacent its forward end, the cable passing about said sheave, an upstanding lever adapted to be pivoted intermediate its ends to the tractor at the rear for swinging in a longitudinal, vertical plane, a rearwardly projecting ear on the lever intermediate its ends, the cable connecting to said ear, a stay connected between the lower end of the lever and the tongue intermediate its ends, the tractor including power lift release mechanism, a forwardly shiftable, control part of which is mounted adjacent the upper end of the lever, and a connection between the upper end of the lever and said part.

8. In a scraper including a frame supporting a dumping bowl and having a rigid tongue adapted to connect to the power lift mechanism of a tractor at the rear, a transversely extending combination scraper blade and apron unit disposed in front of the bowl in cooperative relation, means mounting the unit on the frame for movement between a lowered scraping position and a raised load retaining position, and means actuated by lowering or raising of the tongue operative to automatically move said unit to scraping position and load retaining position, respectively; there being a hitch assembly between the forward end of the tongue and the power lift mechanism of the tractor, said mechanism including transversely spaced, rearwardly projecting lift arms, and the hitch comprising a cross shaft, a sleeve disposed centrally on the cross shaft, a vertical axis swivel coupling between the sleeve and tongue, laterally outwardly opening saddles on the outer ends of the cross shaft, rigid legs projecting rearwardly from the cross shaft adjacent the saddles, the lift arms seating in the saddles and projecting rearwardly, and connections between the rear ends of the lift arms and said legs.

9. A scraper as in claim 8 including a fairlead and direction-changing unit mounted in connection with the sleeve above the swivel coupling; said actuating means including a cable extending lengthwise of the tongue through the fairlead and sheave unit, and means adapted to anchor the cable to the tractor at the rear in vertically spaced relation to the point of direction changing in said fairlead and sheave unit.

10. In a scraper including a frame supporting a dumping bowl and having a rigid tongue means to connect the front end of the tongue to the power lift mechanism of a tractor whereby the tongue may be selectively lowered and raised, a transversely extending combination scraper blade and apron unit disposed in front of the bowl in cooperative relation, means mounting the unit on the frame for movement between a lowered scraping position and a raised load retaining position, and means actuated by lowering or raising of the tongue operative to automatically move said unit to scraping position and load retaining position, respectively, said unit embodying a blade of substantial width between its leading cutting edge and its trailing edge, the blade being disposed at a forward and downward incline when in scraping position, and upstanding relative to its trailing edge when in load retaining position.

11. A scraper comprising a wheel supported main frame having a rigid tongue, a hitch on the front end of the tongue, means to connect the hitch with the power lift mechanism of a tractor at the rear in a manner whereby the tongue may be raised or lowered while maintaining a draft connection, a dumping bowl mounted on the frame, said bowl being normally open forwardly, a transversely extending combination scraper blade and apron unit disposed in cooperative relation ahead of the bowl, said unit including a blade of substantial width, means mounting said unit for swinging motion between a scraping position with the blade at a forward and downward incline, and a load retaining position with the blade upstanding relative to its rear edge, and means actuated upon lowering or raising of the tongue operative to automatically swing said unit to scraping or load retaining positions, respectively.

12. A scraper comprising a wheel supported main frame having a rigid tongue, a hitch on the front end of the tongue adapted to connect with the power lift mechanism of a tractor at the rear in a manner whereby the tongue may be raised or lowered while maintaining a draft connection, a dumping bowl mounted on the frame, said bowl being normally open forwardly, a transversely extending combination scraper blade and apron unit disposed in cooperative relation ahead of the bowl, said unit including a blade of substantial width, means mounting said unit for swinging motion between a scraping position with the blade at a forward and downward incline, and a load retaining position with the blade upstanding relative to its rear edge, and means actuated upon lowering or raising of the tongue operative to automatically swing said unit to scraping or load retaining positions, respectively; said last named means comprising a cross shaft on the frame, rigid parallel arms radiating from the shaft adjacent its ends, links pivotally connected between the arms and the unit, an upstanding radial lever on the shaft, a control cable secured to the lever and extending forwardly, a direction-changing sheave secured in connection with the hitch, the cable passing about and depending from the sheave, and means to anchor the cable to the tractor below the point of direction changing of said cable.

13. A scraper comprising a wheel supported main frame having a rigid tongue, a hitch on the front end of the tongue adapted to connect with the power lift mechanism of a tractor at the rear in a manner whereby the tongue may be raised or lowered while maintaining a draft connection, a dumping bowl mounted on the frame, said bowl being normally open forwardly, a transversely extending combination scraper blade and apron unit disposed in cooperative relation ahead of the bowl, said unit including a blade of substantial width, means mounting said unit for swinging motion between a scraping position with the blade at a forward and downward incline, and a load retaining position with the blade upstanding relative to its rear edge, and means actuated upon lowering or raising of the tongue operative to automatically swing said unit to scraping or load retaining positions, respectively; said last named means including a cross shaft and transversely spaced parallel arms projecting rigidly from the shaft, the arms depending when the blade is in scraping position and projecting rearwardly when said unit is in earth retaining position, and a transverse sweep plate connected between said arms for movement therewith, said plate sweeping rearwardly above the blade in leading relation thereto when the blade swings between said scraping and load retaining positions.

14. A scraper as in claim 1 in which said last named means includes upstanding links pivotally connected with opposite end portions of the blade and apron unit; said links being beyond dead center in a direction to prevent relative elevation of the unit when it is in scraping position.

COLLIS P. RENAUD.

REFERENCES CITED

The following references are of record in the file of this patent:

UNITED STATES PATENTS

| Number | Name | Date |
|---|---|---|
| 1,858,599 | Renaud | May 17, 1932 |